United States Patent
Abo-Hasna et al.

(10) Patent No.: US 8,117,078 B2
(45) Date of Patent: *Feb. 14, 2012

(54) METHOD AND PROGRAM PRODUCT FOR EVENT MONITORING

(75) Inventors: Ziad Abo-Hasna, St. Ingbert (DE); Chantal Ullrich, Saarbrücken (DE); Markus Welter, Ottweiler (DE)

(73) Assignee: SAP AG, Walldorf (DE)

( * ) Notice: Subject to any disclaimer, the term of this patent is extended or adjusted under 35 U.S.C. 154(b) by 12 days.

This patent is subject to a terminal disclaimer.

(21) Appl. No.: 12/611,754

(22) Filed: Nov. 3, 2009

(65) Prior Publication Data

US 2010/0049582 A1  Feb. 25, 2010

Related U.S. Application Data

(63) Continuation of application No. 11/071,982, filed on Mar. 4, 2005, now Pat. No. 7,647,250.

(60) Provisional application No. 60/551,221, filed on Mar. 8, 2004, provisional application No. 60/563,284, filed on Apr. 16, 2004.

(51) Int. Cl.
*G06Q 30/00* (2006.01)
*G06F 17/30* (2006.01)

(52) U.S. Cl. .......... 705/26.1; 705/28; 705/330; 705/333; 705/26.81

(58) Field of Classification Search ........ 705/26.1–27.2, 705/28, 330–341
See application file for complete search history.

(56) References Cited

U.S. PATENT DOCUMENTS

| | | | |
|---|---|---|---|
| 4,750,119 A | 6/1988 | Cohen et al. | |
| 4,752,877 A | 6/1988 | Roberts et al. | |
| 5,297,250 A | 3/1994 | Leroy et al. | |
| 5,313,392 A | 5/1994 | Temma et al. | |
| 5,315,508 A | 5/1994 | Bain et al. | |
| 5,325,304 A | 6/1994 | Aoki | |
| 5,400,253 A | 3/1995 | O'Connor | |
| 5,500,513 A | 3/1996 | Langhans et al. | |
| 5,615,109 A | 3/1997 | Eder | |
| 5,621,201 A | 4/1997 | Langhans et al. | |
| 5,710,578 A | 1/1998 | Beauregard et al. | |
| 5,758,327 A | 5/1998 | Gardner et al. | |
| H1743 H | 8/1998 | Graves et al. | |

(Continued)

FOREIGN PATENT DOCUMENTS

JP  2004-30343 A  1/2004

(Continued)

OTHER PUBLICATIONS

"Supply chain management: Rx software that kills the pain". Ourchasing, vol. 131, No. 15. p. 11(2). Sep. 19, 2002.*

(Continued)

*Primary Examiner* — William Allen
(74) *Attorney, Agent, or Firm* — Foley & Lardner LLP

(57) ABSTRACT

An event management method, program product and system for monitoring the status of a purchase order involves receiving purchase order information from a user, obtaining timeline information corresponding to the purchase order, receiving information from one or more sources on the status of the purchase order, using the received information to monitor progress of the purchase order against the timeline information, and providing a notification to the user upon identification of a missed date in the timeline information. Remedial measures are suggested or taken by the event management system.

16 Claims, 1 Drawing Sheet

U.S. PATENT DOCUMENTS

| | | |
|---|---|---|
| 5,796,614 A | 8/1998 | Yamada |
| 5,832,496 A | 11/1998 | Anand et al. |
| 5,870,716 A | 2/1999 | Sugiyama et al. |
| 5,878,400 A | 3/1999 | Carter, III |
| 5,920,846 A | 7/1999 | Storch et al. |
| 5,930,769 A | 7/1999 | Rose |
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A | 5/2000 | Ferguson et al. |
| 6,115,690 A | 9/2000 | Wong |
| 6,151,588 A | 11/2000 | Tozzoli et al. |
| 6,185,550 B1 | 2/2001 | Snow et al. |
| 6,260,024 B1 | 7/2001 | Shkedy |
| 6,260,241 B1 | 7/2001 | Brennan |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,473,794 B1 | 10/2002 | Guheen et al. |
| 6,484,149 B1 | 11/2002 | Jammes et al. |
| 6,505,093 B1 | 1/2003 | Thatcher et al. |
| 6,507,851 B1 | 1/2003 | Fujiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 | 3/2006 | Whitesage |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,188,080 B1 | 3/2007 | Walker et al. |
| 7,216,086 B1* | 5/2007 | Grosvenor et al. ............... 705/7 |
| 7,283,975 B2 | 10/2007 | Broughton |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B1 | 4/2009 | Dvorak et al. |
| 7,523,048 B1 | 4/2009 | Dvorak |
| 7,574,383 B1 | 8/2009 | Parasnis et al. |
| 7,647,250 B2* | 1/2010 | Abo-Hasna et al. ......... 705/27.1 |
| 7,660,742 B2 | 2/2010 | Biwer et al. |
| 7,693,749 B2 | 4/2010 | Wittmer et al. |
| 7,742,948 B2 | 6/2010 | Welter et al. |
| 7,805,335 B2 | 9/2010 | Wittmer et al. |
| 7,813,949 B2 | 10/2010 | Grendel et al. |
| 7,831,487 B2 | 11/2010 | Abo-Hasna et al. |
| 7,853,491 B2 | 12/2010 | Wittmer et al. |
| 2001/0011295 A1 | 8/2001 | Kobayashi et al. |
| 2001/0013731 A1 | 8/2001 | Shinohara et al. |
| 2001/0019332 A1 | 9/2001 | Fisher |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1* | 12/2001 | Stewart ............................ 705/26 |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter, III |
| 2002/0048369 A1 | 4/2002 | Ginter et al. |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 | 8/2002 | Hawkins |
| 2002/0111892 A1 | 8/2002 | Sharp et al. |
| 2002/0116241 A1 | 8/2002 | Sandhu et al. |
| 2002/0120523 A1 | 8/2002 | Yang |
| 2002/0120533 A1* | 8/2002 | Wiesenmaier .................. 705/27 |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1 | 9/2002 | Inoue et al. |
| 2002/0143644 A1 | 10/2002 | Tosun et al. |
| 2002/0143690 A1 | 10/2002 | Mahajan et al. |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188499 A1* | 12/2002 | Jenkins et al. .................. 705/10 |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0033231 A1 | 2/2003 | Turner et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0065574 A1 | 4/2003 | Lawrence |
| 2003/0074269 A1 | 4/2003 | Viswanath |
| 2003/0083961 A1 | 5/2003 | Bezos et al. |
| 2003/0120528 A1 | 6/2003 | Kruk et al. |
| 2003/0126024 A1 | 7/2003 | Crampton et al. |
| 2003/0128392 A1 | 7/2003 | O'Brien et al. |
| 2003/0144916 A1 | 7/2003 | Mumm et al. |
| 2003/0149578 A1* | 8/2003 | Wong ............................... 705/1 |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1 | 11/2003 | Avery et al. |
| 2003/0217024 A1* | 11/2003 | Kocher ........................... 706/47 |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 | 8/2004 | Hoskin et al. |
| 2004/0172321 A1 | 9/2004 | Vemula et al. |
| 2004/0186763 A1 | 9/2004 | Smith |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1 | 5/2005 | Dudat et al. |

| | | | |
|---|---|---|---|
| 2005/0102192 A1 | 5/2005 | Gerrits et al. | |
| 2005/0102227 A1 | 5/2005 | Solonchev | |
| 2005/0131807 A1 | 6/2005 | Schaefer et al. | |
| 2005/0165659 A1 | 7/2005 | Gruber | |
| 2005/0171825 A1 | 8/2005 | Denton et al. | |
| 2005/0197912 A1 | 9/2005 | Wittmer et al. | |
| 2005/0197913 A1 | 9/2005 | Grendel et al. | |
| 2005/0197914 A1 | 9/2005 | Welter et al. | |
| 2005/0197915 A1 | 9/2005 | Biwer et al. | |
| 2005/0197918 A1 | 9/2005 | Wittmer et al. | |
| 2005/0197921 A1 | 9/2005 | Abo-Hasna et al. | |
| 2005/0197949 A1 | 9/2005 | Welter et al. | |
| 2005/0203813 A1 | 9/2005 | Welter et al. | |
| 2005/0216325 A1 | 9/2005 | Ziad et al. | |
| 2005/0216357 A1 | 9/2005 | Wittmer et al. | |
| 2005/0216359 A1 | 9/2005 | Welter et al. | |
| 2005/0216375 A1 | 9/2005 | Grendel et al. | |
| 2005/0235020 A1 | 10/2005 | Gabelmann et al. | |
| 2005/0240488 A1 | 10/2005 | Grendel et al. | |
| 2005/0243792 A1 | 11/2005 | Simon et al. | |
| 2005/0246482 A1 | 11/2005 | Gabelmann et al. | |
| 2005/0251734 A1 | 11/2005 | Gabelmann et al. | |
| 2006/0015417 A1 | 1/2006 | Wittmer et al. | |
| 2006/0020512 A1 | 1/2006 | Lucas et al. | |
| 2006/0036507 A1 | 2/2006 | Pujar et al. | |
| 2006/0074746 A1 | 4/2006 | Kline et al. | |
| 2006/0074747 A1 | 4/2006 | Kline et al. | |
| 2006/0074748 A1 | 4/2006 | Kline et al. | |
| 2006/0074749 A1 | 4/2006 | Kline et al. | |
| 2006/0074751 A1 | 4/2006 | Kline et al. | |
| 2006/0112099 A1 | 5/2006 | Musgrove et al. | |
| 2006/0184401 A1 | 8/2006 | DelGaudio et al. | |
| 2007/0050272 A1 | 3/2007 | Godlewski et al. | |
| 2010/0049582 A1 | 2/2010 | Abo-Hasna et al. | |
| 2010/0100455 A1 | 4/2010 | Song | |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

U.S. Appl. No. 60/374,892, filed Apr. 22, 2002, Krajec.

Abraham et al., "An Implemented System for Improving Promotion Productivity Using Store Scanner Data", *Marketing Science*, vol. 12, No. 3, Summer 1993 (pp. 248-269).

Anon., "(A lot of) life after H. Ross: Electronic Data Systems", *Financial World*, vol. 162, No. 22, Nov. 9, 1993 (p. 50 (2)).

Brown, "The Effects of Assortment Composition Flexibility on Operating Efficiency", (Abstract Only), Dissertation Abstracts International, vol. 55/08-A, available at least by 1994 (p. 2458. 255 pgs.).

4R Systems, "Beyond Markdown Management", *the 4caster*, Issue 4, vol. 2, summer/autumn 03 (4 pgs.).

Jensen et al., "Long-term Construction Contracts: The Impact of Tamra '88 on Revenue Recognition", *Journal of Construction Education*, vol. 2, No. 1, Spring 1997 (pp. 37-53).

Kelkar et al., "Price Modeling in Standards for Electronic Product Catalogs Based on XML", May 7-11, 2002 (pp. 366-375).

Logistics Today—Show Story, "Retailers Manage Markdown Challenges Using i2 Solutions", NRF 92$^{nd}$ Annual Convention & Expo—New York, Jan. 13, 2003 (2 pgs.).

Melcer, "Local tech firm creates retail markdown tool", *Cincinnati Business Courier*, Mar. 27, 2000 (3 pgs.).

"New Pegasystems Enterprise Application Provides Central Hub for Proactively Managing Operational Exception", *Business Wire*, Feb. 3, 2004 (p. 5211). [recovered from Dialog database].

Profitlogic, available at http://web.archive.org/web/*/http://www.profitlogic.com, available at least by Apr. 15, 2005 (22 pgs.).

Pro Quest, Staffware: Staffware and Biomni join forces to provide end-to-end e-Procurement solution with enhanced workflow capability; Self-service functionality will enable thousands of transactions to be handled daily from the desktop:, M2 Presswire, Coventry: Feb. 6, 2001 (p. 1).

Srinivasan et al., "Concepts and strategy guidelines for designing value enhancing sales promotions", *Journal of Product & Brand Management*, vol. 7, No. 5, 1998 (pp. 410-420).

Subrahmanyan et al., "Developing optimal pricing and inventory policies for retailers who face uncertain demand", *Journal of Retailing*, vol. 72, No. 1, Spring, 1996 (p. 7(24)).

Wilson, "Changing the process of production", *Industrial Management*, vol. 37, No. 1, Jan./Feb. 1995 (pp. 1-2).

"HIE Awarded empactHealth.com Integration Services Contract" Pearson, J. Edward, PR Newswire, New York: Feb. 1, 2000. p. 1, 3 pages.

Bartle et al., "A Review of State Procurement and Contracting", Journal of Public Procurement, 2003, vol. 3, Issue 2, pp. 192-214.

Camas, Yuksel, "APS system integration: more challenges [Advanced planned and Schedule]", Materials Management and Distribution, Toronto, Jan. 2001, vol. 46, Iss. 1, 2 pages.

Chen et al., Near-Optimal Pricing and Replenishment Strategies for a Retail/Distribution System, 1D Operations Research, Nov./Dec. 2001, vol. 49, No. 6, pp. 839-853.

Chen et al., "Quantity and Due Date Quoting Available to Promise", Information Systems Frontier, Dec. 2001, vol. 3, No. 4, pp. 477-488.

Goodwin, David R., 1CThe Open-to-Buy System and Accurate Performance Measurement, 1D International Journal of Retail & Distribution Management, Mar./Apr. 1992, vol. 20, Iss. 2, 7 pages.

Jensen et al., "Long-Term Construction Contracts: The Impact of Tamra '88 on Revenue Recognition", Journal of Construction Education, Spring 1997, vol. 2, No. 1, pp. 37-53.

Saad et al.; "An Integrated Model for Order Release and Due-Date Demand Management", Journal of Manufacturing Technology Management, 2004, vol. 15, No. 1, 14 pages.

Staib et al., "Purchasing and Supply Chain Management", Air Force Journal of Logistics, Fall 2002, vol. 26, No. 3, 9 pages.

Stander, Bella; "The choices for taking inventory—and control: a menu of possibilities is available to stores that want to install—or upgrade—computer inventory control systems", Publishers Weekly, Mar. 20, 1995, pp. 33(3), vol. 242, No. 12, retrieved via Dialog on Dec. 17, 2010, 10 pages.

Van Der Zee et al., "On-line scheduling of multi-server batch operations.", IIE Transactions, vol. 33, No. 7, Jul. 2001, pp. 569-586, 18 pages.

\* cited by examiner

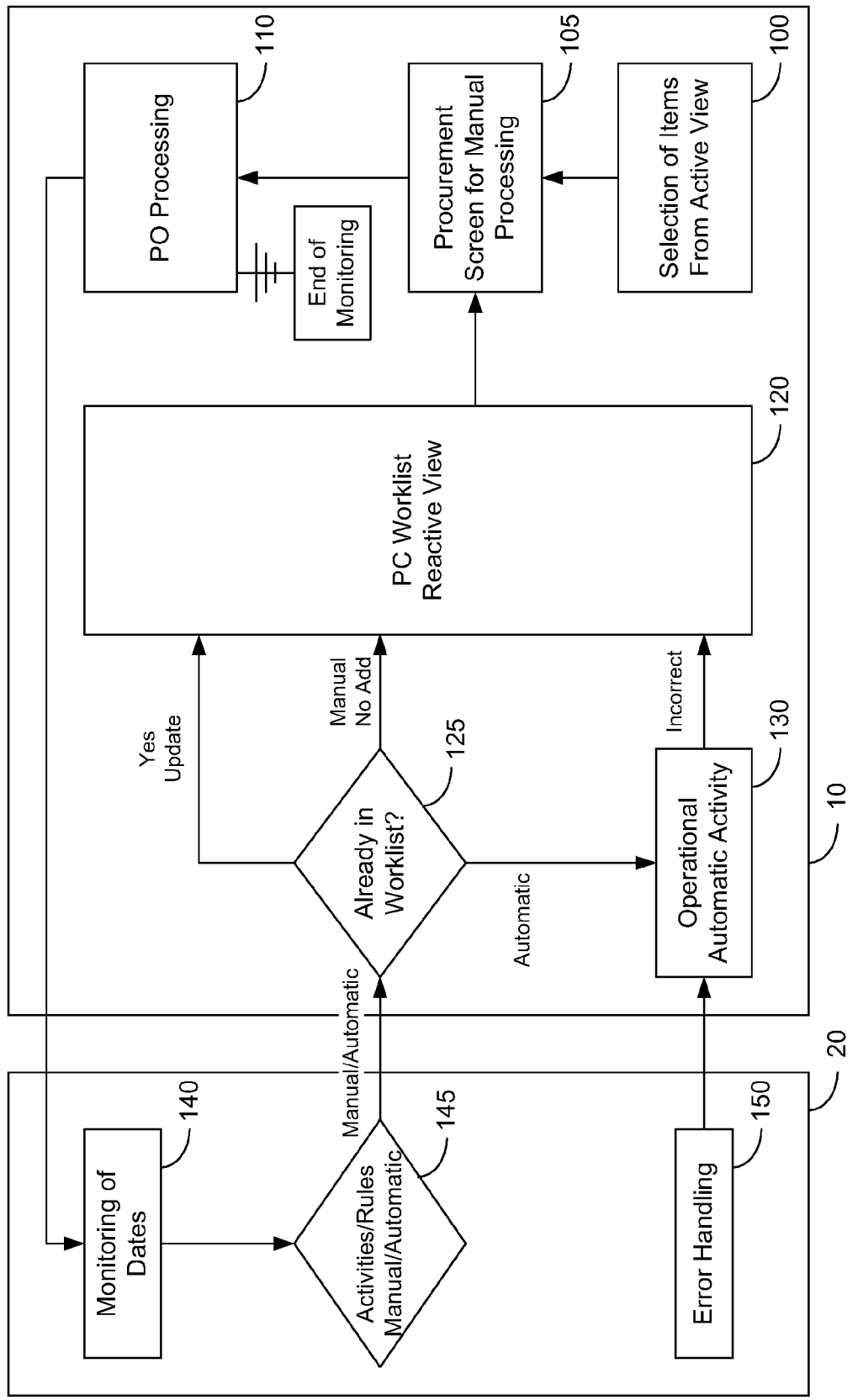

METHOD AND PROGRAM PRODUCT FOR EVENT MONITORING

CROSS-REFERENCE TO RELATED PATENT APPLICATIONS

This application is a Continuation of U.S. application Ser. No. 11/071,982, filed Mar. 4, 2005, which claims priority from U.S. Provisional Application No. 60/551,221, filed Mar. 8, 2004 and U.S. Provisional Application No. 60/563,284, filed Apr. 16, 2004, each of which are incorporated herein by reference in their entirety.

BACKGROUND

The present disclosure is directed to the purchasing and delivery of products and specifically to the monitoring of purchase order status and the performance of follow-up tasks to effect timely delivery.

In a retail environment, it is important to have effective timing in the purchasing and delivery of products. For example, if a goal is to have goods be on store shelves for sale on a specific date, those goods should be delivered in such a timeframe to effect that goal. If the goods arrive to the store too early, it creates inventory problems and costs. If the goods arrive too late, the sales window is eroded, resulting in lost sales. Therefore, it is important for the buyer or person making purchase orders to have adequate guidance on the timing for placing such purchase orders in order to meet the retailer's goals.

It is also important for the buyer to be able to track the progress of the purchase order. If there are delays with the fulfillment of the purchase order, either at the vendor or at some intermediate delivery company, it is important for the buyer to know of such delays promptly. This allows for remedial measures to be taken so that the retailer's goal of having the goods on sale on a specific date may still be met. Current systems and methods do not adequately facilitate successful remedial measures to be taken. Furthermore, current systems provide insufficient guidance on the timing of purchase orders or on the monitoring of the progress of purchase order fulfillment. They do not facilitate the control of follow up and remedial activities from the purchase ordering system.

SUMMARY

An embodiment of the present disclosure discloses an event management method, program product and system for monitoring the status of a purchase order. This embodiment involves receiving purchase order information from a user, obtaining timeline information corresponding to the purchase order, receiving information from one or more sources on the status of the purchase order, using the received information to monitor progress of the purchase order against the timeline information, and providing a notification to the user upon identification of a missed date in the timeline information. In an additional embodiment of the disclosure, the event management method further includes the initiation of follow-up and remedial activities to facilitate timely delivery and fulfillment of the purchase order. In an additional embodiment of the disclosure, the event management system is fully integrated with the purchase ordering system. Key dates in a purchase order timeline, such as the purchase order date, are transferred freely between the event management system and the purchase order system.

Other features and advantages of the present disclosure will become apparent to those skilled in the art from the following detailed description. It should be understood, however, that the detailed description and specific examples, while indicating preferred embodiments of the present disclosure, are given by way of illustration and not limitation. Many changes and modifications within the scope of the present disclosure may be made without departing from the spirit thereof, and the disclosure includes all such modifications.

BRIEF DESCRIPTION OF THE DRAWINGS

The foregoing advantages and features of the disclosure will become apparent upon reference to the following detailed description and the accompanying drawings, of which:

FIG. 1 is a block diagram illustrating an exemplary embodiment of an event management system for monitoring the status of a purchase order.

DETAILED DESCRIPTION OF THE EXEMPLARY EMBODIMENTS

FIG. 1 illustrates the method and system of event management in accordance with a preferred embodiment of the present disclosure. As shown in this figure, the event management system 20 is independent from the retail system 10. This however reflects one specific embodiment and the scope of the present disclosure is not limited by such separation.

A user of the retail system 10 is able to create and place purchase orders using preferably an order entry workbench. This workbench allows a user to create and submit purchase orders for goods. As shown in element 100, the user selects products from an active view on a display screen of the order entry workbench. Element 105 refers to a procurement screen displayed on said workbench for processing of purchase orders. Element 110 refers to the actual processing of purchase orders as performed by the retail system. Element 115 refers to the end of monitoring of a purchase order. This end can be reached when the purchase order has been fulfilled or cancelled.

For a given product, the user is given a timeline that contains information regarding that product pertaining to its delivery and timing. This timeline can be pre-existing using historical data and contains information such as the events that must take place between the placement of the purchase order and the goods being placed on the shelves in the retail store. For example, the user can input the target date for having the goods on the shelves. The retail system, using the timeline for the product will calculate the latest date on which a purchase order can be placed for such goods. The timeline contains information on other events in the purchase order fulfillment process such as: the production end date, the departure date of the goods from the vendor, the arrival date of the goods at a destination port, the goods received date at the distribution center of the retailer, the departure date of the goods from the distribution center, the received date of the goods at the retailer store, and finally, the presentation date of the goods at the store.

If, for a given product being ordered, there is no pre-existing timeline using historical data, a new timeline is generated using default values. The user is also able to edit the timeline associated with the product being ordered and the events contained therein. The timelines are stored in a database or are transmitted as part of the purchase order.

Once the purchase order is placed, the event monitoring system 20 retrieves the timeline either from a database or from the purchase order and uses it and the purchase order information to monitor, in element 140, compliance with the event dates set forth in the timeline. This monitoring is important in determining whether key dates are being met or are being missed indicating a delay.

The information needed for such monitoring can come directly from the third party vendor or delivery company through human queries or through computer based methods. In the preferred embodiment of the disclosure, the event management system 20 interfaces with the appropriate computer systems of the various third parties including the vendor, the delivery companies, and/or internal computer systems of the retailer, in order to obtain real-time or near real-time status information on the status of the purchase order and the location of the products. This is facilitated by the event monitoring system's use of standard interfaces.

For each specific vendor, or for a plurality of vendors, a customer is able to define an activity profile. This activity profile contains rules regarding the procedures to be used with that vendor or vendors. For example, a buyer dealing with a large or important vendor to the retailer should not be able to cancel a purchase order without first giving the vendor a specific amount of time to remedy a delay. This could be one of the rules embodied in the activity profile for that vendor. Also, depending on the country of the vendor, local laws may require that certain procedures be followed, procedures that are not required in countries of other vendors. Such differences can be addressed through the activity profiles.

The event management system 20, has access to such activity profiles corresponding to vendors of specific products and purchase orders. In element 145, the event management system determines, based on the activity profile for the relevant vendor and/or other rules as determined by the user, what action to take if it is determined that a date in the timeline corresponding to the purchase order has been missed. If such a problem arises, an attempt is made to place an indicator of the problem in the user's work list in the order entry workbench. As shown in element 125, if the problem is new in that it has not been added before, it is added to the user's work list as shown in element 120.

The event management system offers a suggestion to the user of a remedial measure for addressing the problem identified. For example, it may suggest to cancel the purchase order. The user can then manually decide whether or not to cancel the purchase order. Only those remedial measures that are allowed for the situation and the specific vendor based on the activity profile are offered to the user. For example, even if a shipment is delayed, the user may be prevented from canceling a purchase order from an important vendor. In such an example, the user may decide to give the vendor an extra week for delivery of the goods. The user would update the purchase order in element 105 and the system would proceed by monitoring compliance with the new date.

Certain actions or remedial measures can be performed automatically without manual input by a user. Based on the activity profile for a vendor, the event management system may, for example, in element 130 send an initial reminder to the vendor upon determining that a date has been missed.

The event management system also handles errors as shown in element 150. For example, if a user cancels a purchase order for which the retailer has already paid the vendor, the cancellation will not be processed and the problem will be indicated on the user's work list 120.

The information and analysis provided by the event management system can be used not only to remedy delays but also to trigger advance notification for advertising and capacity management. For example, in the purchase order process, when the products reach a specific point, it may trigger deployment of an advertising campaign for said products.

The event management system of an embodiment of the disclosure is fully integrated with the purchase ordering system. Key dates in a purchase order timeline, such as the purchase order date, are transferred freely between the event management system and the purchase order system.

As noted above, embodiments within the scope of the present disclosure include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The disclosure is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present disclosure in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present disclosure might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present disclosure has been presented for purposes of illustration and description. It is not intended to be exhaustive or to limit the present disclosure to the precise form disclosed, and modifications and variations are possible in light of the above teachings or may be acquired from practice of the present disclosure. The embodiments were chosen and described in order to explain the principals of the present disclosure and its practical application to enable one skilled in the art to utilize the present disclosure in various embodiments and with various modifications as are suited to the particular use contemplated.

What is claimed is:

1. An event management method for monitoring a status of a purchase order using an event monitoring system, the method comprising:
    receiving by the event monitoring system purchase order information, the purchase order information including data relating to a vendor delivery schedule;
    receiving by the event monitoring system information from one or more sources on the status of the purchase order;
    monitoring by the event monitoring system the status of purchase order based on the received information and the data relating to the vendor delivery schedule;
    generating by the event monitoring system a first notification based on missing a date on the vendor delivery schedule;
    generating by the event monitoring system a first list of a plurality of remedial measures based on the first notification and a first activity profile of a first vendor, the first activity profile including rules for selecting which remedial measures may be utilized for the first vendor;
    generating a second list of a plurality of remedial measures based on a second notification;
    generating a third list of a plurality of remedial measures by selecting remedial measures from the second list based on a second activity profile of a second vendor, wherein the second activity profile includes rules for selecting which remedial measures may be utilized based on the second vendor; and
    storing the first notification in a business warehouse.

2. The event management method according to claim 1, wherein the vendor delivery schedule is generated based on product specific historical data.

3. The event management method according to claim 1, further comprising triggering deployment of an advertising campaign based on an occurrence of one or more milestones in the vendor delivery schedule.

4. The event management method according to claim 1, wherein the step of receiving information further comprises connecting with computers at the one or more sources using a standard communication protocol and interface.

5. The event management method according to claim 1, wherein the first activity profile comprises data relating to local law procedures.

6. The event management method according to claim 1, wherein activity profiles vary for each vendor.

7. The event management method according to claim 1, further comprising automatically taking one or more remedial measures.

8. The event management method according to claim 1, further comprising generating a timeline.

9. The event management method according to claim 1, wherein the timeline is based on extracting information from the purchase order information.

10. The event management method according to claim 1, wherein the timeline is based on accessing a database and retrieving timeline information.

11. The event management method according to claim 1, wherein the first list of the plurality of remedial measures comprises canceling the purchase order.

12. The event management method according to claim 11, wherein the first list of the plurality of remedial measures comprises providing the first vendor with a predetermined time period to remedy a missed event.

13. The event management method according to claim 11, wherein the first list of the plurality of remedial measures comprises a first remedial measure and a second remedial measure, wherein the first remedial measure and the second remedial measure are different types of remedial measures.

14. A program product recorded on a physical medium, the physical medium being selected from the group consisting of RAM, ROM, EPROM, EEPROM, CD-ROM, optical disk storage, magnetic disk storage, or other magnetic storage devices and readable by a computer for event management, the program product comprising machine-readable code for causing, when executed, one or more machines to implement:
    receiving by an event monitoring system information from one or more sources on a status of a purchase order;
    using by the event monitoring system the received information to monitor the status of the purchase order based on comparing the received information to a delivery schedule;
    generating by the event monitoring system a first notification based on missing a date on the delivery schedule;
    generating by the event monitoring system a first list of a plurality of remedial measures based on the first notification and a first activity profile of a first vendor, the first activity profile includes rules for selecting which remedial measures may be utilized for the first vendor;
    generating a second list of a plurality of remedial measures based on a second notification;
    generating a third list of a plurality of remedial measures by selecting remedial measures from the second list based on a second activity profile of a second vendor, wherein the second activity profile includes rules selecting which remedial measures may be utilized based on the second vendor; and
    storing the first notification.

15. The program product according to claim 14, further comprising triggering deployment of an advertising campaign based on an occurrence of one or more milestones in the delivery schedule.

16. The program product according to claim 14, wherein the first activity profile comprises data relating to local law procedures.

* * * * *